US011941286B2

(12) United States Patent
Sheik et al.

(10) Patent No.: US 11,941,286 B2
(45) Date of Patent: Mar. 26, 2024

(54) KEEPING A ZONE RANDOM WRITE AREA IN NON-PERSISTENT MEMORY

(71) Applicant: Western Digital Technologies, Inc., San Jose, CA (US)

(72) Inventors: Karimulla Sheik, Bangalore (IN); Naga Shankar Vadalamani, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 106 days.

(21) Appl. No.: 17/592,920

(22) Filed: Feb. 4, 2022

(65) Prior Publication Data

US 2023/0251791 A1 Aug. 10, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS 9,824,734 B2 * 11/2017 Cho .................... G06F 13/1694
10,599,503 B2 * 3/2020 Rahmanian ............... G06F 1/30
10,990,526 B1 4/2021 Lam et al.
2021/0055864 A1 2/2021 Noh et al.
2021/0089225 A1 * 3/2021 Boyd .................... G06F 3/0679

OTHER PUBLICATIONS

Maheshwari, U., "From Block to Rocks: A Natural Extension of Zoned Namespaces", HotStorage '21, Jul. 27-28, 2021, Virtual, USA.

* cited by examiner

*Primary Examiner* — Brian R Peugh
(74) *Attorney, Agent, or Firm* — Rutan & Tucker LLP; Hani Z. Sayed; Ravi Mohan

(57) ABSTRACT

A storage device and methods of operation are disclosed. The device comprises a controller configured to execute a read command, a write command, a first vendor specific command, and a second vendor specific command, and further comprises a persistent memory and a non-persistent memory. When executing the first vendor specific command, the device begins operation in a first vendor specific mode. In this mode, the device stores write data in the non-persistent memory and does not immediately commit the write data to persistent memory. When executing the second vendor specific command, the device begins operation in a second vendor specific mode. In this mode, the device immediately commits write data to persistent memory. The first vendor specific mode is ideal when power supplies are healthy and redundant, while the second vendor specific mode is ideal when power supplies are not redundant and/or healthy.

20 Claims, 8 Drawing Sheets

600
STORAGE DEVICE RECEIVES A VENDOR SPECIFIC COMMAND 610
MOVE ZONE RANDOM WRITE AREA (ZRWA) TO NON-PERSISTENT MEMORY (NPM) ? 615
NO
YES
620 ENABLE THE STORAGE DEVICE FEATURE TO RELAX THE PERSISTENT BACKUP OPTION
630 ALLOCATE A PORTION OF NON-PERSISTENT MEMORY
640 MAP THE ALLOCATED PORTION OF NPM AS THE ZRWA REGION
650 COMMIT THE DATA IN THE ZRWA REGION TO PERSISTENT MEMORY
660 DISABLE THE STORAGE DEVICE FEATURE TO RELAX THE PERSISTENT BACKUP OPTION
END 100
410
MAIN POWER SUPPLY / UPS
411
412
420
AUXILIARY POWER SUPPLY / UPS
421
422
140
110
HOST-COMPUTING DEVICE
140
POWER MONITOR
139
STORAGE DEVICE INTERFACE
125
120
STORAGE DEVICE
126
CONTROLLER

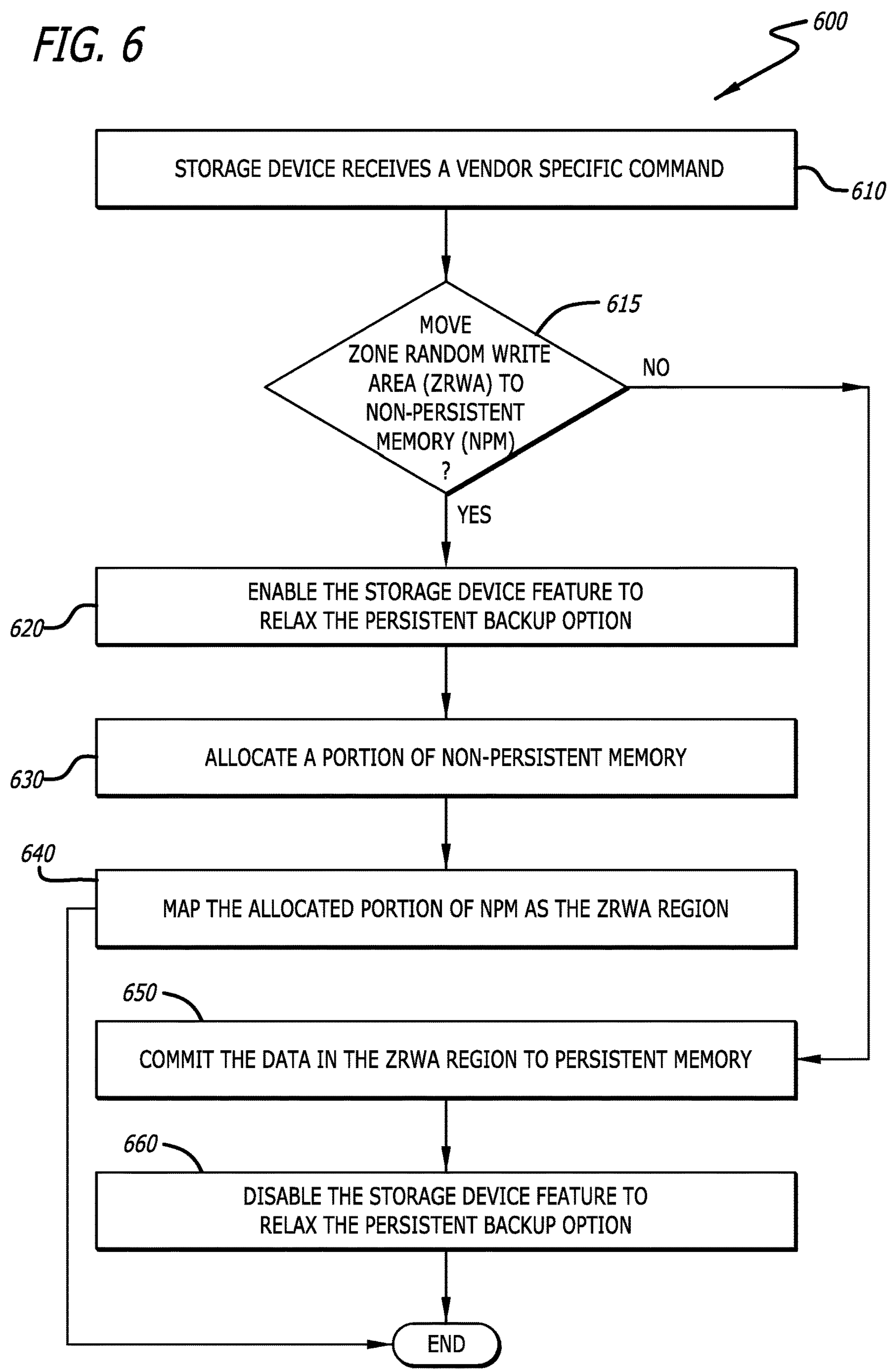
FIG. 6
600
STORAGE DEVICE RECEIVES A VENDOR SPECIFIC COMMAND
610
MOVE ZONE RANDOM WRITE AREA (ZRWA) TO NON-PERSISTENT MEMORY (NPM) ?
615
NO
YES
ENABLE THE STORAGE DEVICE FEATURE TO RELAX THE PERSISTENT BACKUP OPTION
620
ALLOCATE A PORTION OF NON-PERSISTENT MEMORY
630
640
MAP THE ALLOCATED PORTION OF NPM AS THE ZRWA REGION
650
COMMIT THE DATA IN THE ZRWA REGION TO PERSISTENT MEMORY
660
DISABLE THE STORAGE DEVICE FEATURE TO RELAX THE PERSISTENT BACKUP OPTION
END 700
STORAGE DEVICE RECEIVES HOST READ COMMAND
710
715
IS THE ZONE RANDOM WRITE AREA (ZRWA) DATA IN NON-PERSISTENT MEMORY (NPM) ?
YES
NO
720
730
READ THE DATA FROM NON-PERSISTENT MEMORY
READ THE DATA FROM PERSISTENT MEMORY
END 800
STORAGE DEVICE RECEIVES HOST WRITE COMMAND
810
815
IS THE ZONE RANDOM WRITE AREA (ZRWA) IN NON-PERSISTENT MEMORY (NPM) ?
YES
NO
820
830
WRITE THE DATA TO NON-PERSISTENT MEMORY
WRITE THE DATA TO PERSISTENT MEMORY
END

KEEPING A ZONE RANDOM WRITE AREA IN NON-PERSISTENT MEMORY

FIELD

The present disclosure relates to resource management in Solid State Drives (SSDs). More particularly, the present disclosure relates to managing non-persistent memories in SSDs.

BACKGROUND

In recent years, electronic products have been designed to be faster, cheaper, and easier to use in order to obtain a competitive advantage in the marketplace. This is true in mass storage devices as well. SSDs, in particular, have become increasingly popular as the cost per bit of the underlying NAND flash integrated circuits has decreased. Current generations see 3D structures stacking up to 176-word line layers high on a single—up from 96- or 128-word line layers in the two years since 2019. As a result of this growth, SSD capacities continue to rise while the cost per bit continues to fall.

Most SSD vendors have access to the same NAND flash chips (exceptions possibly being vendors like Samsung, Micron, and Intel, who make both the drives and their own NAND flash chips), so that part of the cost of an SSD is fairly uniform. Thus, vendors need to differentiate themselves using features such as higher speeds, greater reliability, lower power, and vendor specific modes of operation.

One opportunity for improvement is finding reliable ways around the intrinsic slowness of NAND flash memory write operations. This can be mitigated somewhat with high-speed I/O interfaces moving large blocks of data around, or the use of Dynamic Random Access Memory (DRAM) or Static Random Access Memory (SRAM) caches internal to SSDs.

One problem that must be addressed is power supply stability during write operations. This is a fundamental characteristic of the NAND flash devices but carries ramifications for designers of SSDs and even storage systems comprising many storage devices. Once a NAND flash integrated circuit is commanded to write the contents of its page buffer (typically on-chip SRAM) into a page of flash memory cells in its memory array, a complicated sequence of analog and digital operations must be executed properly to avoid losing or corrupting the data being written. A power supply blackout (total loss of power) or brownout (partial loss of power below the required minimum voltage) can prevent the proper completion of all those operations. This is often unrecoverable, and the write data is lost. This is unacceptable in many cases.

To mitigate these concerns, computer and storage system vendors typically provide multiple power supplies in high-reliability applications like enterprise and commercial data centers. There is typically a main power supply and an auxiliary supply, and if the main power supply fails, the auxiliary can be switched in to carry the load without a blackout or brownout, causing lost data. Typically, Uninterruptible Power Supplies (UPS) are used, which contain a provision to maintain the output voltage of the supply for a certain time to allow recoveries, crossovers to auxiliary supplies, or orderly shutdowns of the overall system even if the main power grid supplying power to the data center fails.

SSD vendors must also address this issue, but without internal power supplies, they are dependent on the outside system to provide power to them. None of the solutions to mitigate this are without problems. DRAM and SRAM caches are non-persistent memories that will lose their data if the power supply blacks or browns out, while the NAND devices need time to complete ongoing write operations. The SSD internal power can be maintained by means of a battery backup or a supercapacitor, but this adds the cost of an extra component as well as valuable Printed Circuit Board (PCB) space and is not ideal.

BRIEF DESCRIPTION OF DRAWINGS

The above and other aspects, features, and advantages of several embodiments of the present disclosure will be more apparent from the following description is presented in conjunction with the following several figures of the drawings.

FIG. 6 is a flowchart depicting a process of operating a storage device in accordance with an embodiment of the disclosure;

Figure 1:
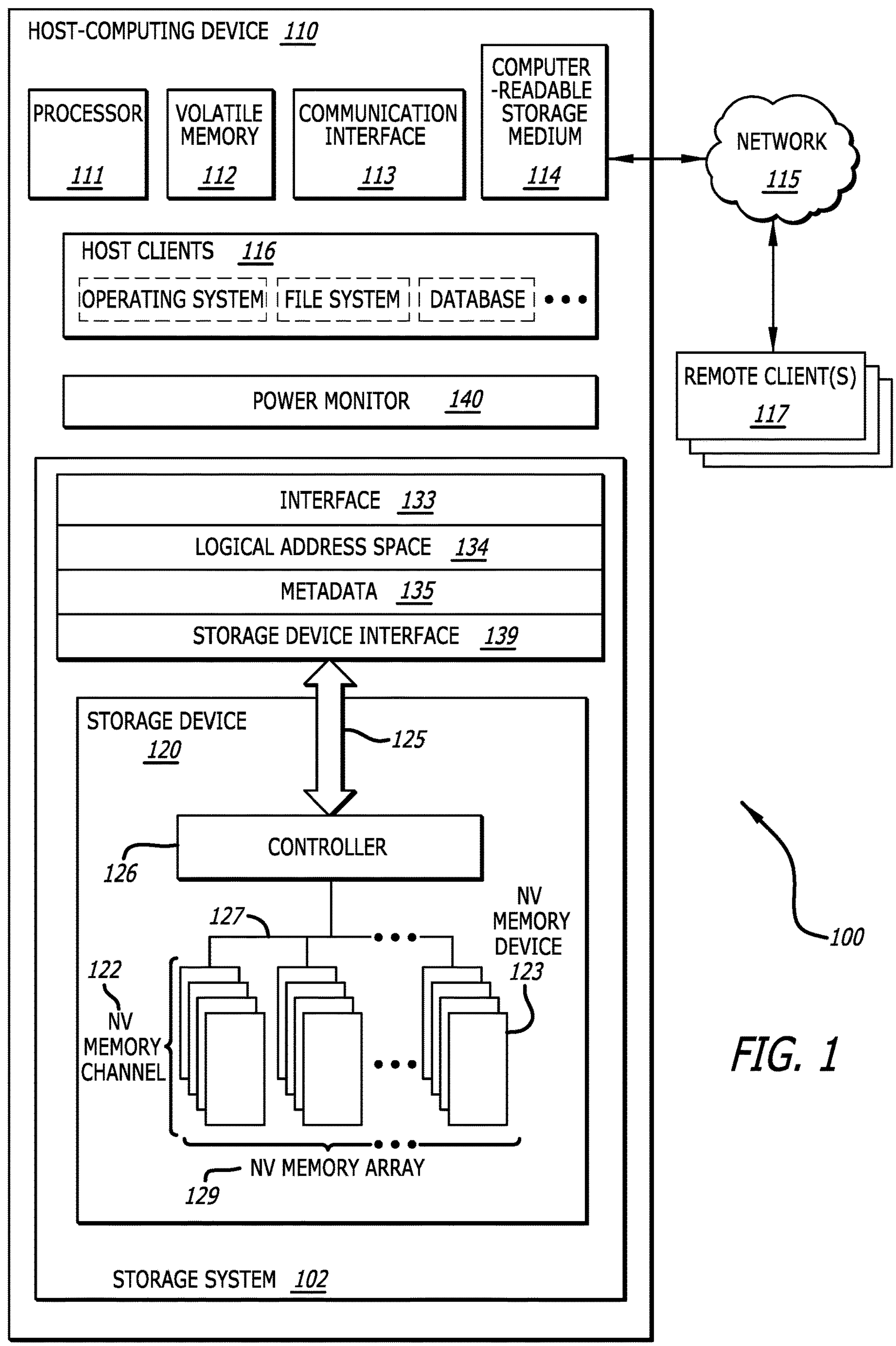
FIG. 1 is a schematic block diagram of a system in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common but well-understood elements that are useful or necessary in a commercially feasible embodiment are often not depicted in order to facilitate a less obstructed view of these various embodiments of the present disclosure.

DETAILED DESCRIPTION

In response to the problems and scenarios described above, improved apparatuses and methods for reliably mitigating power outages and associated data loss without additional components in SSDs are disclosed. Different vendor specific modes of operation are provided. In one mode, a non-persistent memory (e.g., DRAM, SRAM, etc.) cache is used to increase the performance of manipulating write data prior to committing it to persistent memory (e.g., NAND flash memory). In another mode, the non-persistent memory is not used to manipulate write data before committing it.

In high-reliability applications like servers, disk arrays, data centers, and the like, the host-computing device is responsible for monitoring the health of the power supplies which provide power to the SSD. Health in this context means that if a power supply is operating optimally, it is said to be "healthy," and if operating suboptimally, it is said to be "unhealthy." This monitoring might be performed by the Central Processing Unit (CPU) of a computer or server, or an additional processor like, for example, a service processor, may be used. Typically, there is power monitoring hardware in the host-computing device, the power supplies, or elsewhere in the system to perform this function.

In a first vendor specific mode, the SSD makes use of the non-persistent memory cache to increase the performance of manipulating write data prior to committing it to persistent memory. Committing to persistent memory may mean writing the current write data into one or more pages in NAND flash memory. It is said to be a "commitment" because, in many current-generation NAND devices, no partial page writes are allowed. This means each word line in the array may be written exactly once each program/erase cycle, and the only way to recapture those pages is to erase all of the pages in their associated memory blocks. Since a NAND flash block has a finite number of program/erase cycles before wearing out, it is best to do as little writing to NAND as possible to extend the life of the SSD. This also saves in power consumption increases performance, as manipulating the write data in DRAM or SRAM requires less power and can be done faster than doing repeated writes to NAND.

In a second vendor specific mode, the non-persistent memory is not used to manipulate write data prior to committing it to NAND. These manipulations must be done elsewhere in the system, or repeated writes to NAND must be used. The host-computing device is responsible for issuing vendor specific commands to place the SSD in one vendor specific mode or the other and to change modes when desired. In this context, vendor specific means that it is a non-standard or non-specification command that will only operate correctly on an SSD provided by a specific vendor or manufacturer.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, assembly languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, loading, storing, buffering, and/or transferring data can include the entirety of the data, a portion of the data, a set of the data, and/or a subset of the data. Likewise, reference to reading, writing, loading, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a system in accordance with an embodiment of the disclosure is shown. The system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. In some embodiments, a service processor may be present. (A service processor is a microcontroller that typically monitors the physical environment of host-computing device 110 and controls things like power supplies, fans, etc.) The communication interface 113 may include one or more network interfaces configured to communicatively couple the host-computing device 110 and/or controller 126 of the storage device 120 to a communication network such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more dual inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in some embodiments, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a Serial Advanced Technology Attachment (SATA) bus, a Parallel Advanced Technology Attachment (PATA) bus, a Small Computer System Interface (SCSI) bus, a Serially Attached SCSI (SAS) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an InfiniBand network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device (s) 120. The device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor may be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices (e.g., SSDs), semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a Serial Advanced Technology Attachment (SATA) bus, a parallel ATA bus, a Small Computer System Interface (SCSI) bus, a Serially Attached SCSI (SAS) bus, FireWire, Fibre Channel, a Universal Serial Bus (USB), a PCIe Advanced Switching (PCIe-AS) bus, a network 115, InfiniBand, SCSI RDMA, Non-Volatile Memory Express (NVMe), or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can function as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal-wire-based memory, silicon-oxide based sub-10-nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, may comprise storage class memory (SCM) (e.g., write in place memory, or the like).

The non-volatile memory channels 122 may more generally comprise one or more non-volatile recording media capable of recording data, which may be referred to as a non-volatile memory medium, a non-volatile memory device, a persistent memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to chips, packages, planes, die, or the like. A controller 126 may be configured to manage data operations on the non-volatile memory channels 122, and may comprise one or more processors, programmable processors (e.g., FPGAs), ASICs, microcontrollers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

In some embodiments, host-computing device 110 may further comprise a power monitor 140, which is configured to electrically measure the parameters and determine the health of one or more power supplies internal to host-computing device 110 or elsewhere in system 100.

Figure 2:
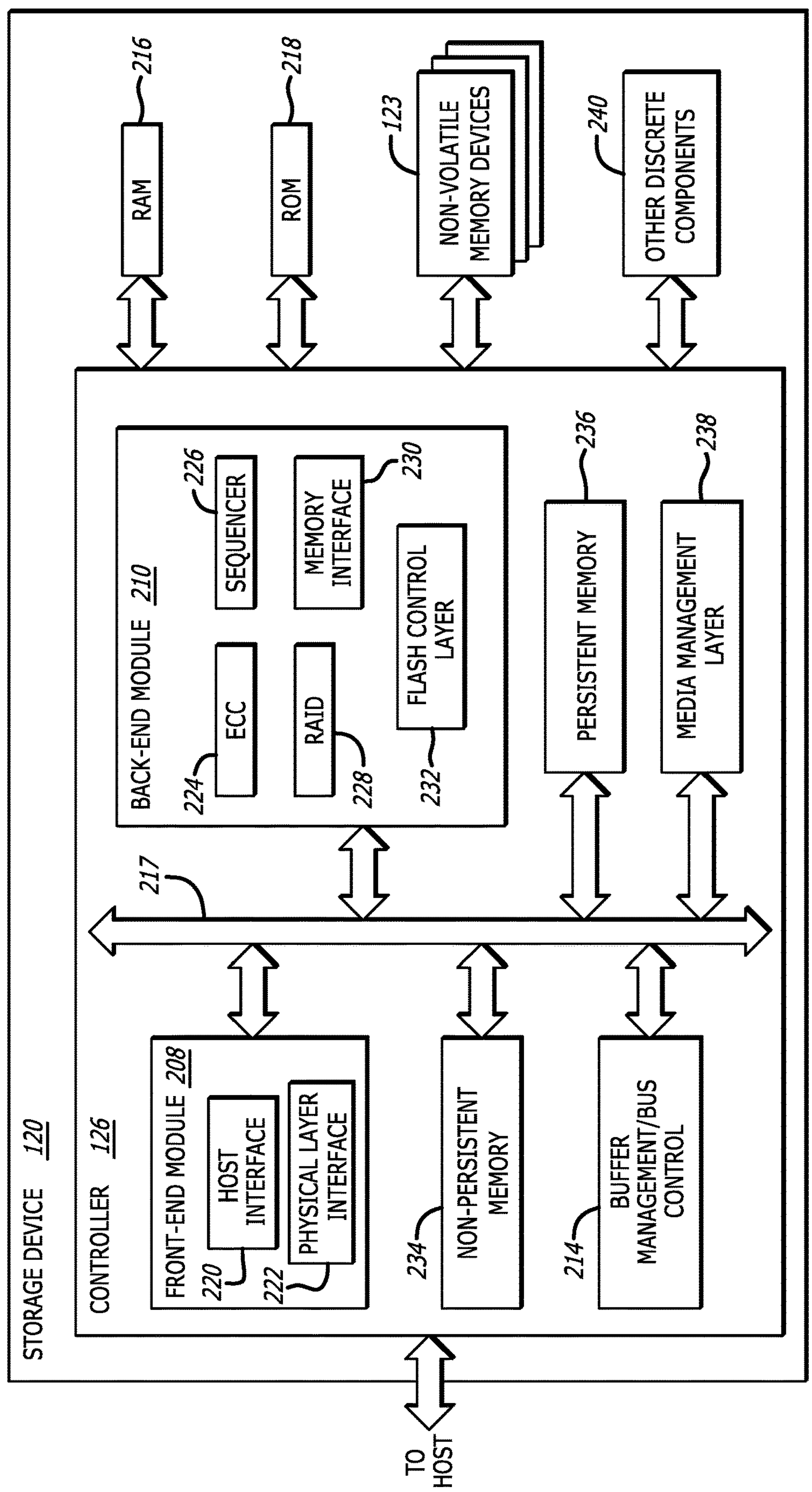
FIG. 2 is a schematic block diagram of a storage device in accordance with an embodiment of the disclosure.

Referring to FIG. 2, a schematic block diagram of a storage device in accordance with an embodiment of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some embodiments, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in Random Access Memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies.

Additionally, the front-end module 208 may include a host interface 220 and a physical layer interface 222 that provides the electrical interface with the host or next-level storage controller. The choice of the type of the host interface 220 can depend on the type of memory being used. Embodiment types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction code (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages the generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238, and buffer management/bus control module 214 are optional components that may not be necessary in the controller 126.

Non-Persistent Memory (NPM) 234 may be a memory that does not maintain its contents when power is removed (e.g., DRAM, SRAM, etc.). In some embodiments, NPM 234 may reside in controller 126, while in other embodiments, it may reside internal to RAM 216 or elsewhere in system 100. Persistent Memory (PM) 236 is a memory that maintains its contents when power is removed (e.g., NAND flash, NOR flash, battery backed up DRAM or SRAM, etc.). In some other embodiments, it may reside internal controller 126, while in yet more embodiments, it may reside in non-volatile memory devices 123 or elsewhere in system 100.

Figure 3:
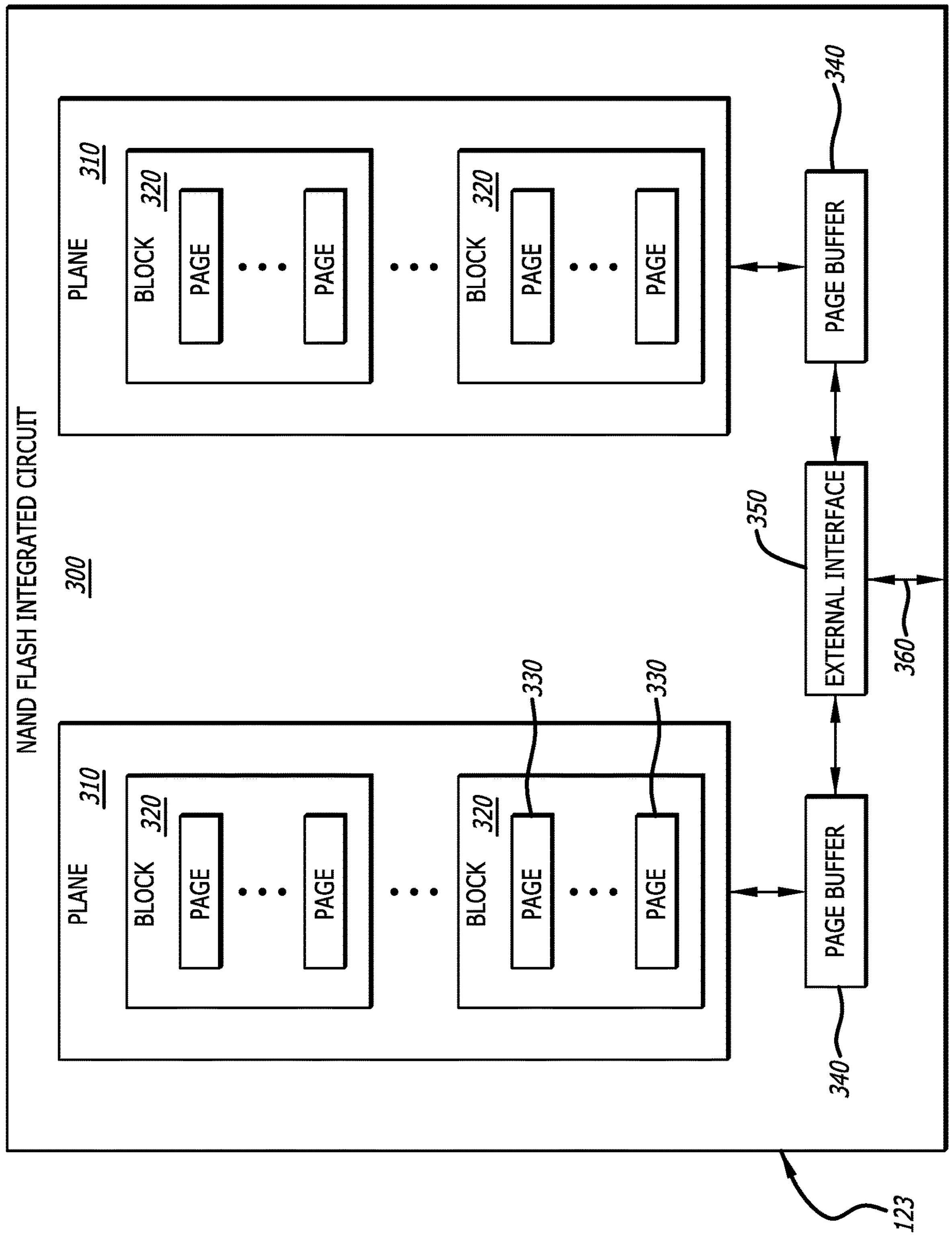
FIG. 3 is a schematic block diagram of a NAND flash integrated circuit in accordance with an embodiment of the disclosure.

Referring to FIG. 3, a schematic block diagram of a NAND flash integrated circuit in accordance with an embodiment of the disclosure is shown. Non-Volatile Memory Devices (NVMD) 123 typically comprise chips like NAND Flash Integrated Circuit (NFIC) 300. The memory array portion of NFIC 300 may comprise one or more planes 310. Each plane may comprise one or more blocks 320. Each block may comprise one or more pages 330.

A plane is the smallest unit (or logical unit or LU) of the memory array portion that may independently execute an operation (or command). For example, in theory, one plane 310 could be executing a read operation (or command) while another plane 310 could be executing a write (or program or committal) operation (or command) simultaneously—assuming there were no conflicts for a shared I/O bus or other shared resources on NFIC 300.

A block 320 is the smallest unit of the memory array that may be erased. An erase operation will destroy all of the data in each page 330 of block 320. Thus, data that must be retained needs to be read and stored elsewhere before the start of the erase operation.

Page 330 is the smallest unit of the memory array that may be programmed with data. Typically, a page consists of all of the memory cells on a single word line. All the cells are either programmed together or read together in a single operation. In high-capacity NFICs used in SSDs, page sizes are typically 2 kilobytes (KB) or 4 KB of data. In addition, to the data area, there is also a spare area used for storing Error Correction Code (ECC) bits and other metadata relevant to the page. The spare area is typically 64 bytes or 128 bytes for 2 KB and 4 KB pages, respectively.

NFIC 300 further comprises a page buffer 340 for each plane 310. The page buffers 340 all share a common external interface 350, which couples them to the external data bus 360. Page buffer 340 is typically implemented in SRAM and is the same size as page 330—including memory cells for both the data and spare areas. Since pages are written and read in their entirety in a single operation, the page buffer acts as a scratch pad between a plane 310 and the outside world accessed via external data bus 360.

Random access to the page buffer is very slow (e.g., high latency), as it is not the ideal mode of operation. Typically, data is either written into or read from the page buffer in NFIC 300 as a single unit of data. This allows the external interface 350 and external data bus 360 to operate at fairly high speed and allows the access time to be very fast once the initial latency of the first data occurs. The high latency of this access method makes the page buffers a suboptimal location to actually assemble a page for writing. This is why DRAM or SRAM caches are standard features on SSDs because they are designed to be randomly accessed quickly (e.g., low latency) and have high data throughput due to their high-speed interfaces. Once the page is assembled, it can be transferred to the page buffer as a single data transfer before writing (or programming or committing) it into flash memory.

An inherent reliability concern for any flash memory is a power outage during write (or program) operations. A complicated sequence of operations internal to NFIC 300 is required to program an entire page. If this is interrupted, the write data may be unrecoverable. In a high-reliability system like, for example, a server, a disk array, a data center, etc., typically, an auxiliary (or backup) power supply is present and configured to seamlessly switch over if one of them fails. While having two power supplies is very safe and dual failures are very rare, when one power supply fails, the system becomes vulnerable to the second power supply failing until the failed unit can be repaired or replaced. When operating under these conditions, special care must be taken with SSDs to mitigate the second power supply failing as much as possible if it were to occur. Conversely, operating under normal conditions when both power supplies are healthy creates an opportunity to exploit the safety of both supplies being healthy to improve the performance of an SSD.

Referring back to FIG. 1 and FIG. 2, when both the main and auxiliary power supplies provided to storage device 120 are healthy, there is virtually no danger of losing data in RAM 216 and/or non-persistent memory 234 because it is unlikely both power supplies would fail simultaneously. Since these smaller memories are inherently faster (in both transfer speed and latency) than the larger Non-Volatile Memory (NVM) devices 123, they are ideal to use as scratchpad as a page is assembled before it is committed to non-volatile memory.

Storage device 120 may operate in a different mode in each of these cases. In a first vendor specific mode, when both power supplies are healthy, write data may be retained in non-persistent memory 234 without being committed immediately to NVM devices 123. Multiple pages may be retained there indefinitely while, for example, NVM devices 123 are accessed for reading other data. In a second vendor specific mode, when one power supply is unhealthy, storage device 120 may commit write data to NVM devices 123 as quickly as possible to minimize the time window when it is vulnerable to a second power supply failure.

Typically, SSDs do not have internal power supplies because it would be too costly to add even a single component such as a supercapacitor or battery to maintain data in RAM 216 and/or NPM 234. Thus, SSDs may rely on external power supplied by, for example, storage system 102, host-computing system 110, a server rack in which host-computing system 110 resides, etc. Host-computing system 110 may monitor its own power supplies via power monitor 140. Host-computing system 110 may choose whether storage device 120 will operate in the first or second vendor specific mode.

This may be accomplished by host-computing system 110 sending vendor specific commands to storage device 120. Since these modes are non-standard, it may be important that storage device 120 operate identically to a standard storage device from the point of view of the host clients 116. Once the vendor specific mode is chosen, storage device 120 may operate as it always does, except that it may operate with higher performance in the first mode vendor specific mode and with normal performance in the second vendor specific mode.

In addition to the performance boost available in the first vendor specific mode, storage device 120 may exploit the use of NPM 234 to minimize the number of write (or programing) operations (or commands) that occur in NVM devices 123. Flash memory cells are fragile and can only be erased and programmed so many times. Additionally, reading from flash memory cells can disturb data in adjacent cells. If disturbed too many times, the data may need to be read out of its current page and rewritten to another page. These extra writes may reduce the lifetime of storage device 120.

If the write data from a previous write operation is retained in NPM 234 and not committed to NVM devices 123, the previous write data may be overwritten without any data loss. Similarly, if that uncommitted write data is present in NPM 234, it can be read from NPM 234 without needing to perform a read operation (or command) in NVM devices 123. By reducing the number of write and read operations performed in NVM devices 123, the lifetime and reliability of storage device 120 may be increased in the first vendor specific mode relative to the second vendor specific mode.

This approach also may reduce the power consumption of storage device 120. Write and read operations to and from NVM devices 123 may result in significant power consumption in those devices. If NVM devices 123 remain idle during read and write commands that access write data residing in NPM 234 occurs, the power consumption of storage device 120 will be less in the first vendor specific mode relative to the second vendor specific mode.

Figure 4:
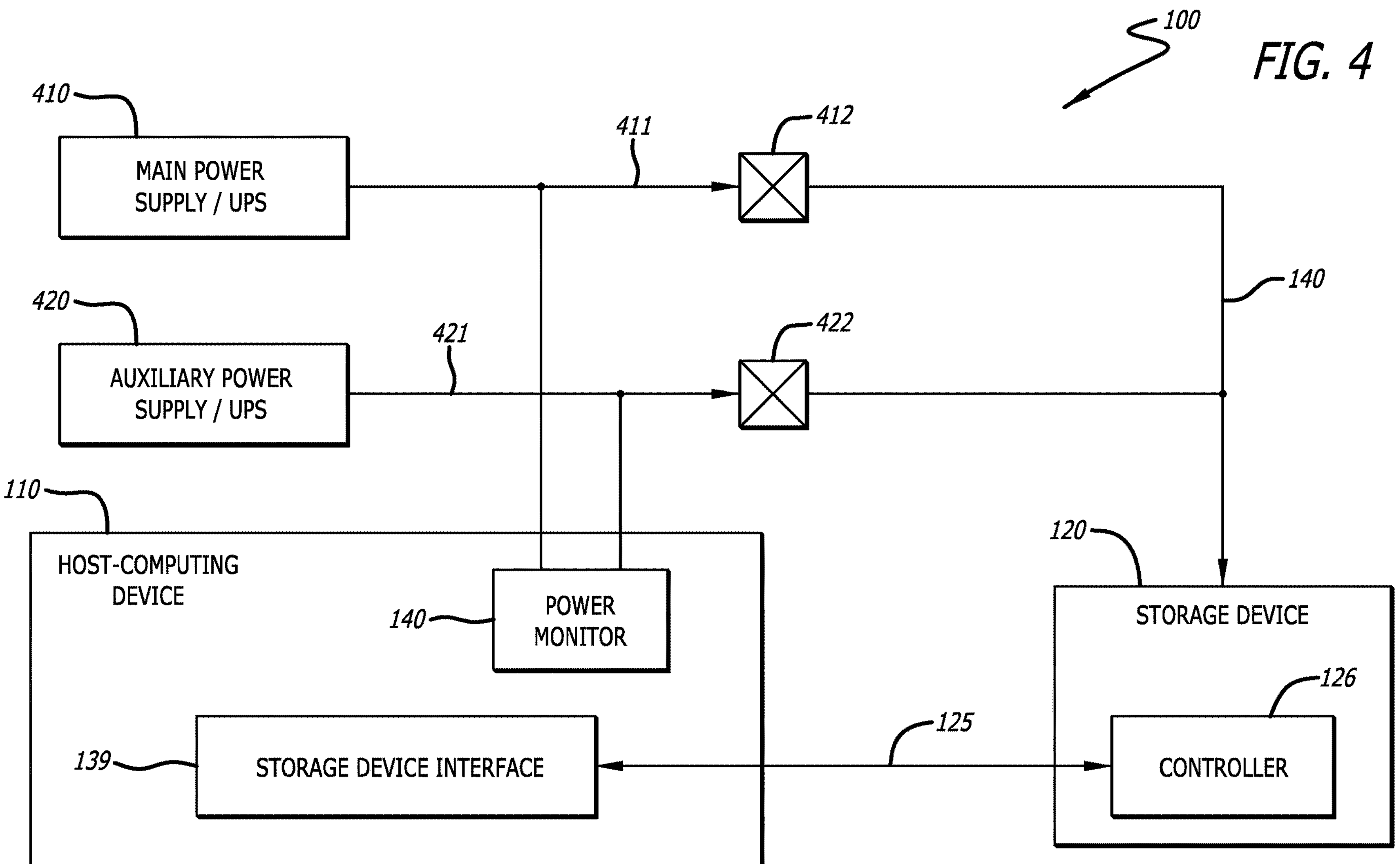
FIG. 4 is a schematic block diagram of a system in accordance with an embodiment of the disclosure.

Referring to FIG. 4 is a schematic block diagram of a system in accordance with an embodiment of the disclosure is shown. A simplified version of system 100 from FIG. 1 is shown comprising host-computing device 110 and storage device 120. Host-computing device 110 is shown comprising storage device interface 139 and power monitor 140, and storage device 120 is shown comprising controller 126. Storage device interface 139 is shown coupled to controller 126 by means of bus 125.

Main power supply 410 may be coupled to power monitor 140 by means of power line 411. Similarly, auxiliary power supply 420 may be coupled to power monitor 140 by means of power line 421. Power lines 411 and 421 are coupled to the inputs of analog switches 412 and 422, respectively. The outputs of analog switches 412 and 422 may be coupled to storage device 120 by means of power line 440. In various embodiments, main power supply 410 and auxiliary power supply 420 may each be implemented as an uninterruptable power supply (UPS).

Power monitor 140 may continuously or periodically evaluate the health of main power supply 410 and auxiliary power supply 420 and may keep host-computing device 110 apprised of their status. If both main power supply 410 and auxiliary power supply 420 are healthy, then host-computing device 110 may issue the first vendor specific command to place storage device 120 into the first vendor specific mode where write operations may remain resident in non-persistent memory 234 indefinitely before being committed to NVM devices 123. If either main power supply 410 or auxiliary power supply 420 is not healthy, then host-computing device 110 may issue the second vendor specific command to place storage device 120 into the second vendor specific mode where write data resident in non-persistent memory 234 is committed to NVM devices 123 soon as possible. In changing from the first vendor specific mode to the second vendor specific mode, any write operations that remain resident in non-persistent memory 234 are first committed to NVM devices 123, and then subsequent writes are then committed to NVM devices 123 as soon as they arrive.

While shown independently in FIG. 4, analog switch 412 may be internal to main power supply 410, and analog switch 422 may be internal to auxiliary power supply 420. Further, the analog multiplexing function performed by analog switches 412 and 422 may be performed in another manner altogether, like, for example, a wired—or type of multiplexer.

Figure 5:
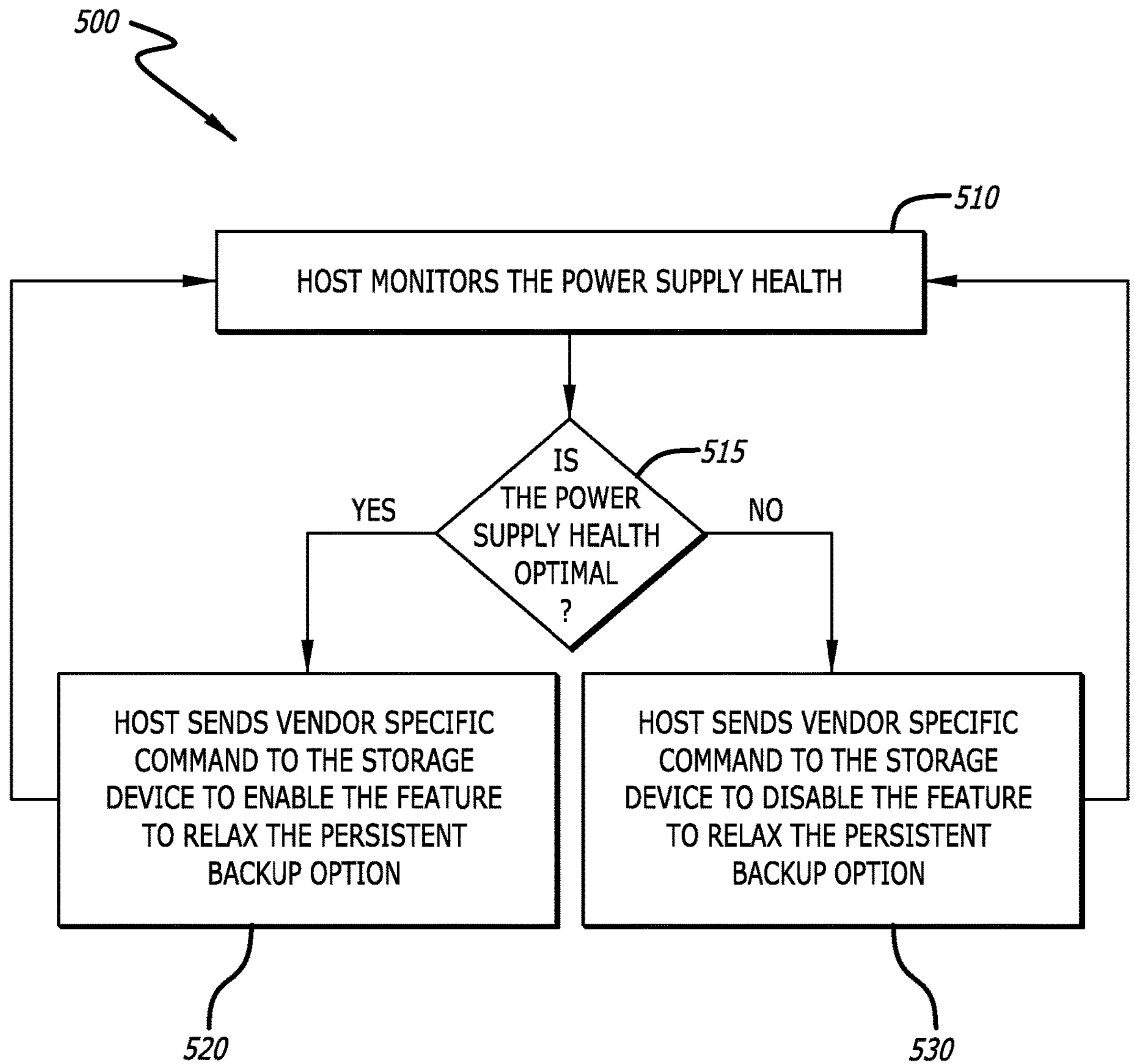
FIG. 5 is a flowchart depicting a process of operating a system in accordance with an embodiment of the disclosure.

Referring to FIG. 5, a flowchart depicting a process 500 of operating a system in accordance with an embodiment of the disclosure is shown. Process 500 may begin with a host-computing device monitoring the health of the system's power supplies (block 510) and determining if they are operating nominally (block 515). If the power supply is operating nominally, the host may send a first vendor specific command to the storage device (block 520).

The first vendor specific command may enable a first vendor specific mode in the storage device to relax the normal persistent backup option. This means that the data from write operations may remain in non-persistent memory indefinitely before being committed to NVM devices in the storage device. This may improve the performance, extend its life, and reduce the power of the storage device. It should be noted that the first vendor specific command may not be issued if the storage device is already in the first vendor specific mode. After the mode switch, the host returns to monitoring the power supply health of the system (block 510).

If the power supply is not operating nominally, the host may send a second vendor specific command to the storage device (block 530). This second vendor specific command may enable a second vendor specific mode in the storage device to disable relaxation of the normal persistent backup option. This means that write operations may be committed to NVM devices from non-persistent memory as expeditiously as possible. It should be noted that the second vendor specific command may not need to be issued if the storage device is already in the second vendor specific mode. When switching to this mode, any write data from previous operations residing in non-persistent memory may be committed to NVM devices in the storage device before processing any new write operations.

Referring to FIG. 6, a flowchart depicting a process 600 of operating a storage device in accordance with an embodiment of the disclosure is shown. Process 600 may begin with the storage device receiving a vendor specific command from a host-computing device (block 610). The command may refer to a memory region known as the Zone Random Write Area (ZRWA) defined in the ZNS Command Set 1.0 specification TP-4076. In the specification, the ZRWA is an area of persistent memory used to assemble smaller writes into complete blocks of data. The storage device may determine if the vendor specific command allows the ZRWA to be moved to a non-persistent memory (block 615).

If so, then a first vendor specific mode of operation may be entered where the feature that allows the ZRWA to reside in NPM (block 620) is enabled. In particular, the ZRWA persistent backup option may be relaxed. A portion of NPM may be allocated for the ZRWA (block 630), and the ZRWA may be mapped to the allocated NPM (block 640).

If not, then a second vendor specific mode of operation may be entered where any data resident in NPM may be committed to persistent memory (block 650), and the feature that allows the ZRWA to reside in NPM is disabled (block 660).

Figure 7:
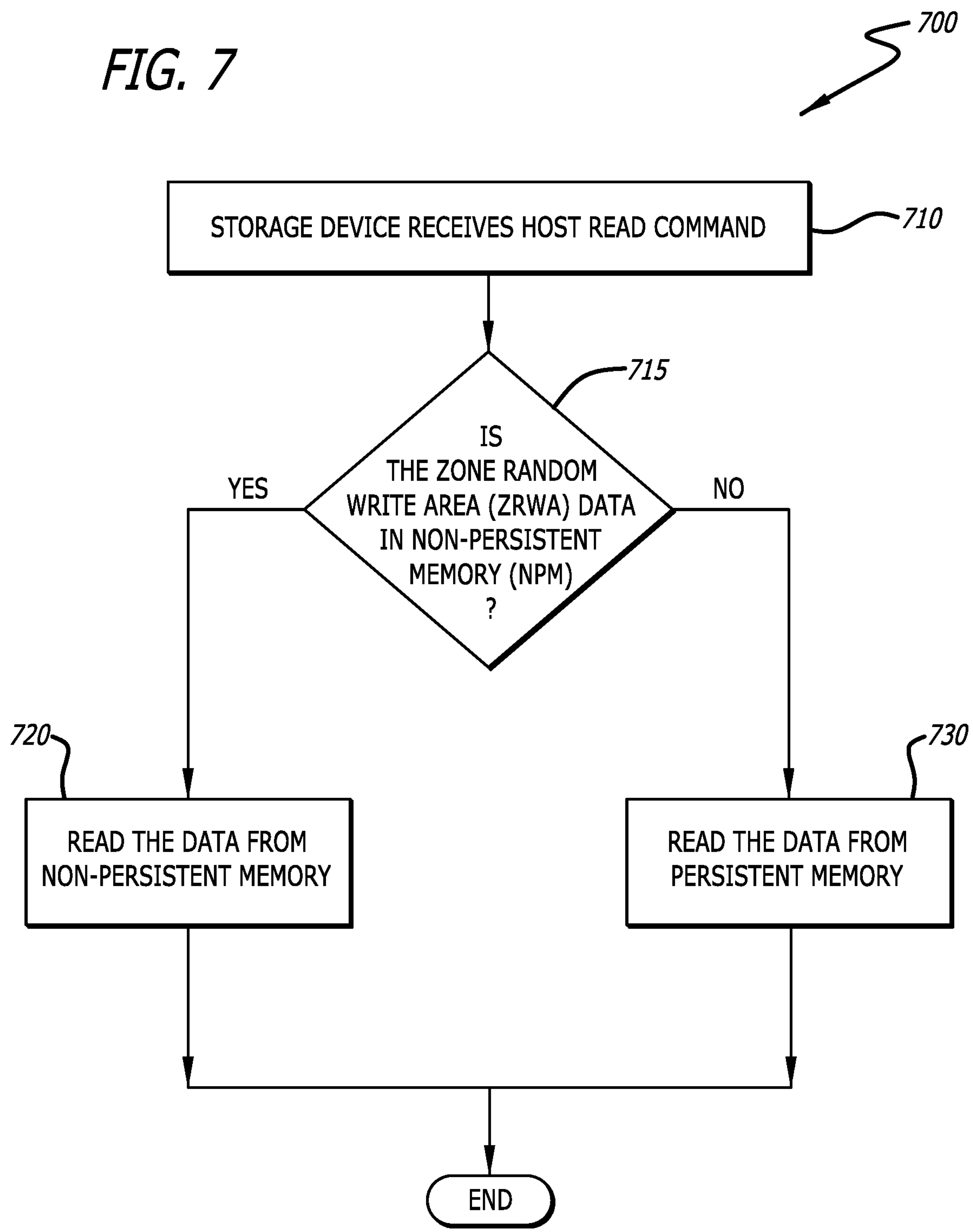
FIG. 7 is a flowchart depicting a process of operating a storage device in accordance with an embodiment of the disclosure.

Referring to FIG. 7, a flowchart depicting a process 700 of operating a storage device in accordance with an embodiment of the disclosure is shown. In many embodiments, the process 700 may begin with the storage device receiving a read command from a host-computing device (block 710). The device may determine if the ZRWA resides in non-persistent memory (block 715). If so, the device may read the data from non-persistent memory (block 720). If not, the device may read the data from persistent memory (block 730).

Figure 8:
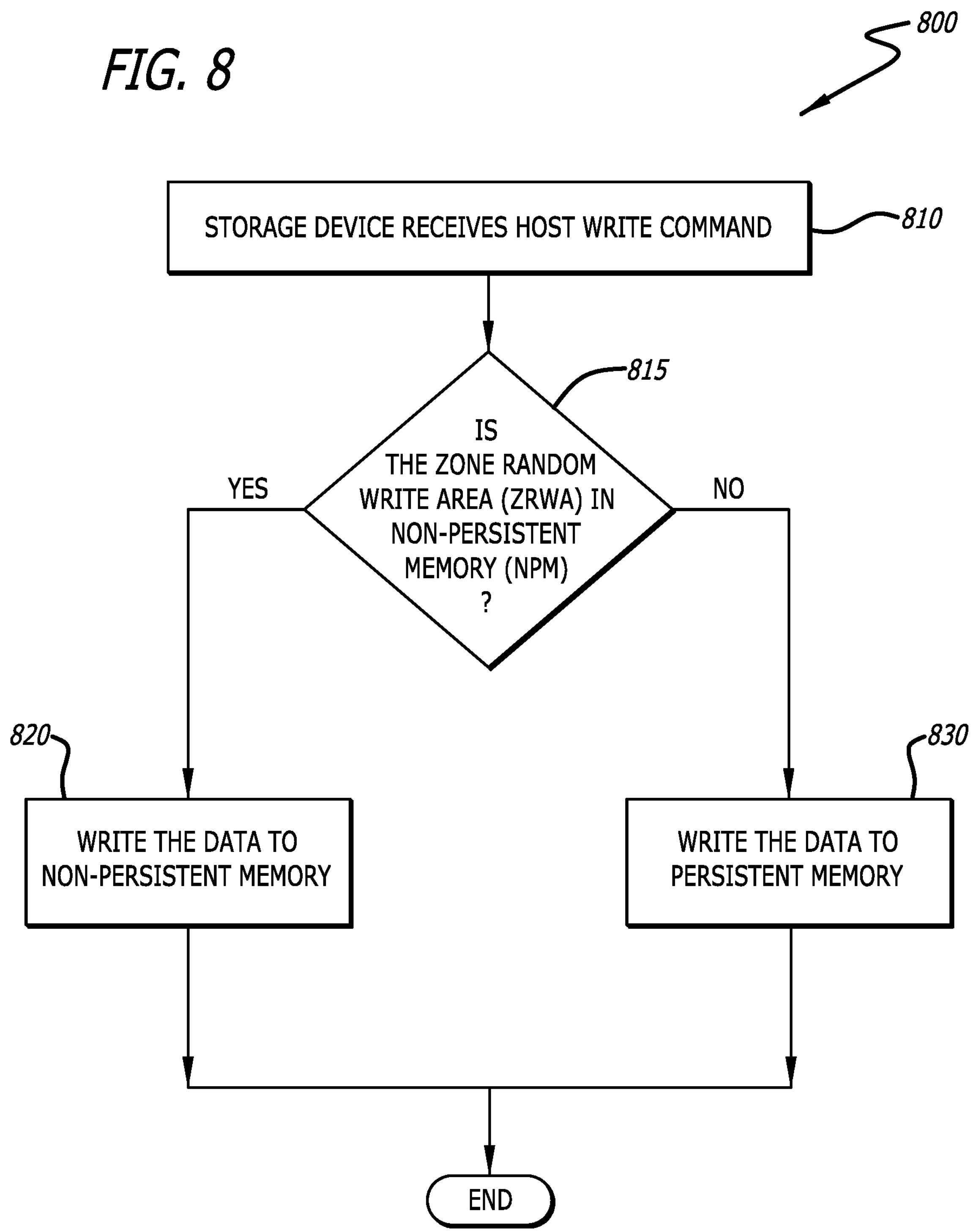
FIG. 8 is a flowchart depicting a process of operating a storage device in accordance with an embodiment of the disclosure.

Referring to FIG. 8, a flowchart depicting a process 800 of operating a storage device in accordance with an embodiment of the disclosure is shown. Process 800 may begin with the storage device receiving a write command from a host-computing device (block 810). The device may determine if the ZRWA resides in non-persistent memory (block 815). If so, the device may write the data to non-persistent memory (block 820). If not, the device may write the data to persistent memory (block 830).

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A system, comprising:
- a device;
- a power supply;
- a host-computing device; and
- a power monitor, wherein:
  - the power monitor determines a health of the power supply, and
  - the host-computing device initiates a mode change in with respect to operation of the device according to the health of the power supply;
  - in response to receiving a vendor specific command from a host-computing device, determining if the vendor specific command allows a Zone Random Write Area ("ZRWA") to be moved to a non-persistent memory; and
  - enabling the storage device with a flexible persistent backup option and allocating a portion of non-persistent memory.

2. The system of claim 1, wherein the device further comprises:
- a controller configured to execute a read command, a write command, a first vendor specific command, and a second vendor specific command upon receipt from the host;
- a persistent memory; and
- a non-persistent memory.

3. The system of claim 2, wherein:
- the host sends the first vendor specific command to the device when the power supply is healthy, and
- the host sends the second vendor specific command to the device when the power supply is not healthy.

4. The system of claim 3, wherein executing the first vendor specific command enables the device to:
- operate in a first vendor specific mode, and
- allocate a portion of the non-persistent memory for storing write data.

5. The system of claim 4, wherein operation in the first vendor specific mode enables the device to store write data in the allocated portion of the non-persistent memory upon receipt of a write command.

6. The system of claim 5, wherein operation in the first vendor specific mode enables the device to access write data from the allocated portion of the non-persistent memory upon receipt of a read command.

7. The system of claim 6, wherein:
- executing the second vendor specific command enables the device to:
  - operate in a second vendor specific mode, and
  - commit all write data in the allocated portion of the non-persistent memory to persistent memory.

8. The system of claim 7, wherein operation in the second vendor specific mode enables the device to store write data only in persistent memory upon receipt of a write command.

9. The system of claim 8, wherein operation in the second vendor specific mode enables the device to only access write data in persistent memory upon receipt of a read command.

10. The device of claim 4, wherein the allocated portion of the non-persistent memory is a Zone Random Write Area.

11. A device, comprising:
- a controller configured to execute a read command, a write command, a first vendor specific command, and a second vendor specific command;
- a persistent memory;
- a non-persistent memory; and wherein:
- in response to receiving a vendor specific command from a host-computing device, determining if the vendor specific command allows a ZRWA to be moved to a non-persistent memory; and
  - enabling the storage device with a flexible persistent backup option and allocating a portion of non-persistent memory.

12. The device of claim 11, wherein operation in the first vendor specific mode enables the device to store write data in the allocated portion of the non-persistent memory upon receipt of a write command.

13. The device of claim 12, wherein operation in the first vendor specific mode enables the device to access write data from the allocated portion of the non-persistent memory upon receipt of a read command.

14. The device of claim 13, wherein:
- executing the second vendor specific command enables the device to:
  - begin operation in a second vendor specific mode, and
  - commit all write data in the allocated portion of the non-persistent memory to persistent memory.

15. The device of claim 14, wherein operation in the second vendor specific mode enables the device to only store write data in persistent memory upon receipt of a write command.

16. The device of claim 15, wherein operation in the second vendor specific mode enables the device to only access write data in persistent memory upon receipt of a read command.

17. The device of claim 11, wherein the allocated portion of the non-persistent memory is a Zone Random Write Area.

18. A method of operating a system, the method comprising:
- monitoring health of a power supply;

changing the mode of operation of a device according to the health of the power supply, wherein the device comprises a persistent memory and a non-persistent memory;

operating the device in a first vendor specific mode of operation by executing a first vendor specific command when the power supply is healthy;

operating the device in a second vendor specific mode of operation by executing a second vendor specific command when the power supply is not healthy;

in response to receiving a vendor specific command from a host-computing device, determining if the vendor specific command allows a ZRWA to be moved to a non-persistent memory; and enabling the storage device with a flexible persistent backup option and allocating a portion of non-persistent memory.

19. The method of claim 18, wherein executing the first vendor specific command further comprises:

beginning the operation of the first vendor specific mode;

allocating a portion of the non-persistent memory for storing data;

enabling the device to store write data in the allocated portion of the non-persistent memory upon receipt of a write command; and enabling the device to access write data from the allocated portion of the non-persistent memory upon receipt of a read command.

20. The method of claim 19, wherein executing the second vendor specific command further comprises:

beginning operation in a second vendor specific mode;

committing all write data in the allocated portion of the non-persistent memory to persistent memory;

enabling the device to only store write data in persistent memory upon receipt of a write command; and enabling the device to only access data in persistent memory upon receipt of a read command.

* * * * *